US011908298B2

(12) United States Patent
Hsu et al.

(10) Patent No.: US 11,908,298 B2
(45) Date of Patent: Feb. 20, 2024

(54) SMOKE DETECTION SYSTEM AND SMOKE DETECTION METHOD

(71) Applicant: VIA Technologies, Inc., Taipei (TW)

(72) Inventors: Jia-yo Hsu, Taipei (TW); Wei-Chung Cheng, Taipei (TW)

(73) Assignee: VIA TECHNOLOGIES, INC., Taipei (TW)

(*) Notice: Subject to any disclaimer, the term of this patent is extended or adjusted under 35 U.S.C. 154(b) by 141 days.

(21) Appl. No.: 17/739,225

(22) Filed: May 9, 2022

(65) Prior Publication Data
US 2023/0177938 A1 Jun. 8, 2023

(30) Foreign Application Priority Data

Dec. 8, 2021 (TW) ................. 110145827

(51) Int. Cl.
G08B 17/12 (2006.01)
G06T 7/11 (2017.01)
(Continued)

(52) U.S. Cl.
CPC .............. G08B 17/125 (2013.01); G06T 7/11 (2017.01); G06T 7/174 (2017.01); G08B 29/186 (2013.01)

(58) Field of Classification Search
CPC .... G08B 17/125; G08B 29/186; G08B 17/10; G06T 7/11; G06T 7/174;
(Continued)

(56) References Cited

U.S. PATENT DOCUMENTS 7,609,856 B2 * 10/2009 Chen ...................... G08B 17/12
382/103
8,208,723 B2 * 6/2012 Yamagishi ........... G08B 17/125
382/218
(Continued)

FOREIGN PATENT DOCUMENTS

CN 111428694 A 7/2020
KR 20100032723 A 3/2010

OTHER PUBLICATIONS

Long, et al.: "Transmission: A New Feature for Computer Vision Based Smoke Detection"; F.L. Wang et al. (Eds.): AICI 2010, Part I, LNAI 6319, pp. 389-396, 2010.

Primary Examiner — Anh V La
(74) Attorney, Agent, or Firm — McClure, Qualey & Rodack, LLP

(57) ABSTRACT

The present disclosure discloses a smoke detection system and a smoke detection method. The smoke detection system includes a camera, a storage unit, and a processor. The camera acquires a current image and a previous image. The storage unit stores a plurality of modules. The processor is coupled with the camera and executes the plurality of modules. The processor generates a difference image based on the current image and the previous image. The processor inputs the current image and the difference image to a semantic segmentation model so that the semantic segmentation model outputs a smoke confidence map. The smoke confidence map is generated based on whether a current environment is a dark environment or a bright environment. The processor analyzes the smoke confidence map to determine whether a smoke event occurs in the current image. Therefore, a reliable smoke detection function can be achieved.

20 Claims, 3 Drawing Sheets

(51) Int. Cl.
*G06T 7/174* (2017.01)
*G08B 29/18* (2006.01)

(58) Field of Classification Search
CPC ........... G06T 2207/30232; G06T 7/254; G06T 1/0007; G06T 7/0002; G06T 7/90; G06V 10/26; G06V 10/54; G06V 10/56; G06V 20/52; G06V 20/60
USPC .......................... 340/577, 628, 627, 619, 632
See application file for complete search history.

(56) References Cited

U.S. PATENT DOCUMENTS

| | | | |
|---|---|---|---|
| 9,818,277 B1* | 11/2017 | Solh | G06V 20/40 |
| 2018/0260963 A1* | 9/2018 | Bai | G06T 7/194 |
| 2020/0012859 A1* | 1/2020 | Zheng | G06V 10/764 |

* cited by examiner

SMOKE DETECTION SYSTEM AND SMOKE DETECTION METHOD

CROSS-REFERENCE TO RELATED APPLICATIONS

This application claims the priority benefit of Taiwan application serial no. 110145827, filed on Dec. 8, 2021. The entirety of the above-mentioned patent applications are hereby incorporated by reference herein and made a part of this specification.

TECHNICAL FIELD

The present disclosure relates to a detection technology, and particularly to a smoke detection system and a smoke detection method.

BACKGROUND

According to a conventional smoke detection system, generally, a camera is provided to monitor a scene where the leakage of flammable and volatile substances may occur in a pipeline, so that the camera can send back a current scene image to an observer, and monitoring is carried out by the observer through judgment by eyes. However, the monitored scene may be influenced by the weather or illumination changes, and thus, when smoke is under influences by factors such as different color temperature changes of different environment light or smoke density changes, the smoke may be imperceptible for human eyes. Even more, based on the influences of factors such as that the shape of the smoke may be unsteady, the color of the smoke may be transparent or semitransparent, and the shape of the smoke may change dynamically, a conventional human eye detection method has problems of poor accuracy and detection efficiency.

SUMMARY

The present disclosure provides a smoke detection system and a smoke detection method, which can achieve a reliable smoke detection function.

The smoke detection system provided by the present disclosure includes a camera, a storage unit, and a processor. The camera acquires a current image and a previous image. The storage unit stores a plurality of modules. The processor is coupled with the camera and executes the plurality of modules to carry out the following operations: the processor generating a difference image based on the current image and the previous image; the processor inputting the current image and the difference image to a semantic segmentation model so that the semantic segmentation model outputs a smoke confidence map, wherein the smoke confidence map is generated based on whether a current environment is a dark environment or a bright environment; and the processor analyzing the smoke confidence map to determine whether a smoke event occurs in the current image.

The smoke detection method provided by the present disclosure includes steps of: acquiring a current image and a previous image by a camera; generating a difference image by a processor based on the current image and the previous image; inputting the current image and the difference image to a semantic segmentation model by the processor so that the semantic segmentation model outputs a smoke confidence map, wherein the smoke confidence map is generated based on whether a current environment is a dark environment or a bright environment; and analyzing the smoke confidence map by the processor to determine whether a smoke event occurs in the current image.

Based on the above, according to the smoke detection system and the smoke detection method provided by the present disclosure, it can be detected whether the smoke event occurs in a current scene with image analysis.

In order to make the features and advantages of the present disclosure clearer and easier to understand, embodiments are given below and illustrated in detail as follows in combination with the accompanying drawings.

Figure 1:
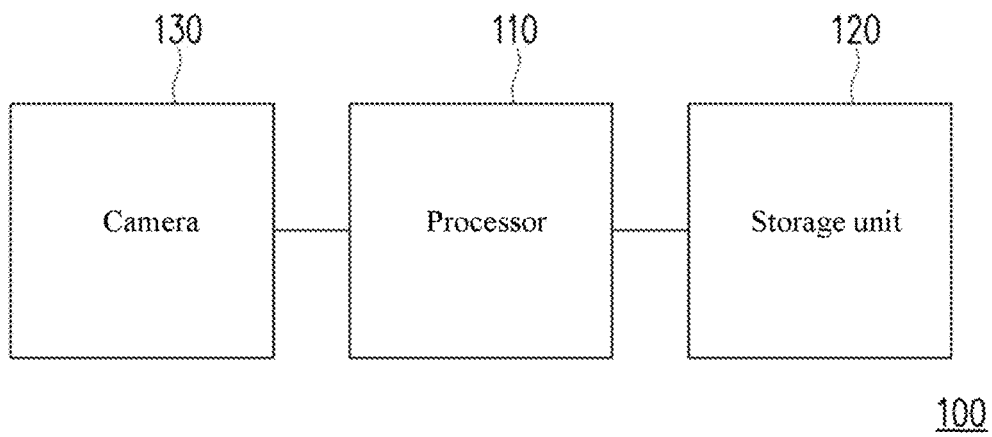
FIG. 1 is a circuit diagram of a smoke detection system according to an embodiment of the present disclosure.

Where numerical references in the drawings are briefly illustrated as follows:

100: smoke detection system; 110: processor; 120: storage unit; 121: difference image generation module; 122: semantic segmentation model; 123: pixel confidence value determination module; 124: smoke alarm determination module; 130: camera; 301: previous image; 302 and 305: current image; 3021: smoke image; 303: difference image; 3031: image difference region; 304: smoke confidence map; 3041: region; 3051: smoke region; T1 to T10: times; S210 to S240 and S410 to S440: steps; Ys: smoke score threshold; and Yn1 to Yn10: smoke scores.

DETAILED DESCRIPTION

In order to make the content of the present disclosure easier and clearer, embodiments are given below as examples by which the present disclosure can be implemented. In addition, wherever possible, elements/components/steps using the same numerical references in the drawings and the implementations represent the same or similar parts.

FIG. 1 is a circuit diagram of a smoke detection system according to an embodiment of the present disclosure. With reference to FIG. 1, the smoke detection system 100 includes a processor 110, a storage unit 120, and a camera 130. The processor 110 is coupled with the storage unit 120 and the camera 130. In this embodiment, the smoke detection system 100 is adapted to be provided in a factory so as to, for example, carry out instant image monitoring on a pipeline for conveying a flammable or volatile substance in the factory, but the application of the present disclosure is not limited thereto. In this embodiment, the camera 130 can sequentially acquire images, and provide the images to the processor 110 for image processing and image analysis so as to determine whether a smoke event occurs in a current scene. In this embodiment, the processor 110 and the storage unit 120 may be provided at a cloud server, and the camera 130 may provide the images to this cloud server through a communication module. However, in an embodiment, the processor 110, the storage unit 120, and the camera 130 may also be integrated in a single device.

In this embodiment, the processor 110 may be, for example, a processing circuit or a control circuit, such as a Central Processing Unit (CPU), a Microprocessor Control Unit (MCU) or a Field Programmable Gate Array (FPGA), and the present disclosure is not limited thereto. In this embodiment, the storage unit 120 may be, for example, a memory, and is used for storing related modules, image data and related software programs or algorithms for the processor 110 to access and execute. The camera 130 may be a camera of a Complementary Metal Oxide Semiconductor (CMOS) Image Sensor (CIS) or a Charge Coupled Device (CCD).

Figure 2:
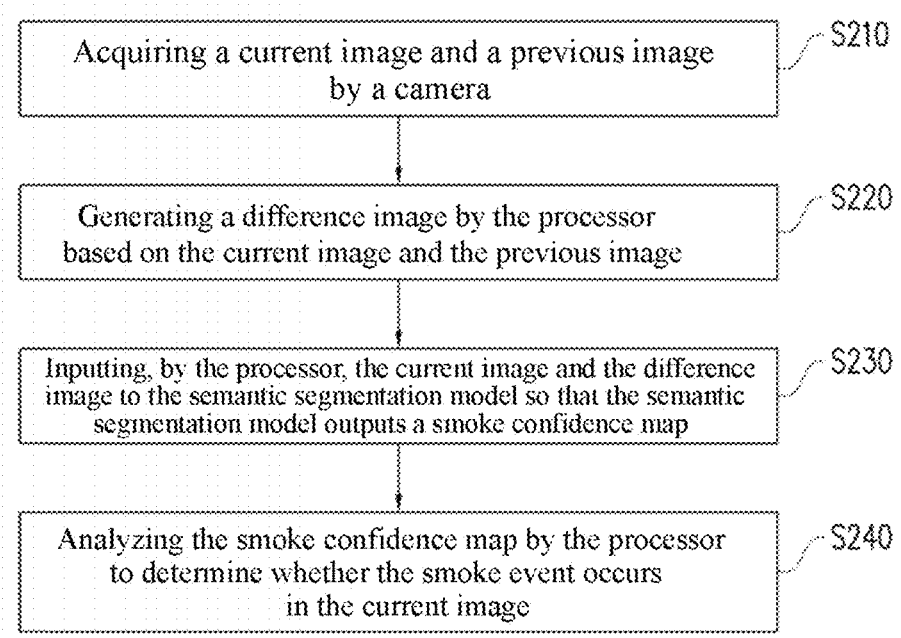
FIG. 2 is a flow chart of a smoke detection method according to an embodiment of the present disclosure.
Figure 3:
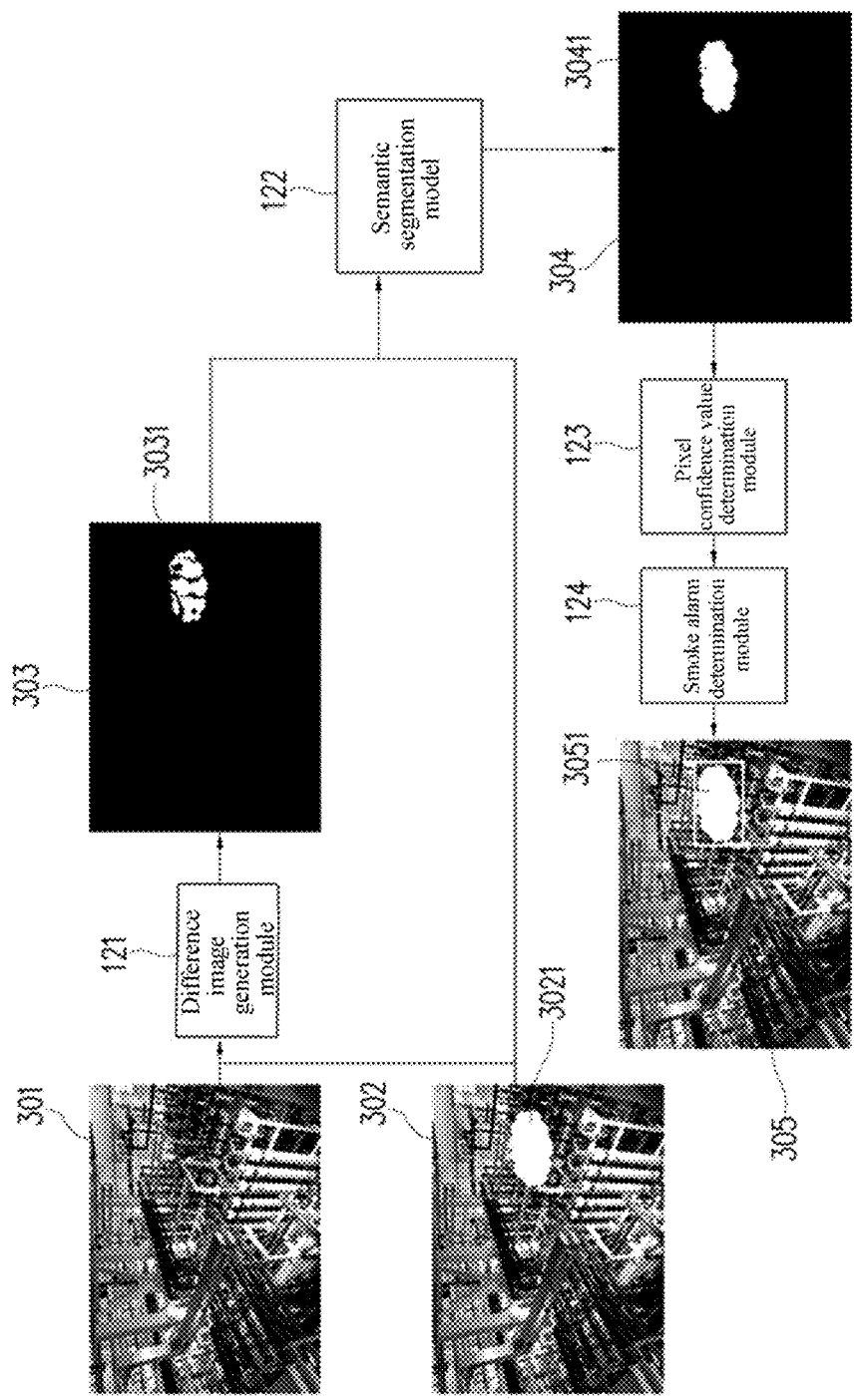
FIG. 3 is a schematic diagram of image processing according to an embodiment of the present disclosure.

FIG. 2 is a flow chart of a smoke detection method according to an embodiment of the present disclosure. FIG. 3 is a schematic diagram of image processing according to an embodiment of the present disclosure. With reference to FIG. 1 to FIG. 3, the smoke detection system 100 may perform the steps S210 to S240 to achieve a smoke detection function. In this embodiment, the storage unit 120 may store a difference image generation module 121, a semantic segmentation model 122, a pixel confidence value determination module 123, and a smoke alarm determination module 124 as shown in FIG. 3. In the step S210, the smoke detection system 100 may acquire a current image 302 and a previous image 301 by the camera 130. As shown in FIG. 3, assume that a smoke event occurs in the current scene at a time point of the current image 302, a smoke image 3021 may be included in the current image 302. In the step S220, the smoke detection system 100 may generate a difference image 303 by the processor 110 based on the current image 302 and the previous image 301. In this embodiment, the processor 110 may execute the difference image generation module 121, and input the current image 302 and the previous image 301 to the difference image generation module 121 so that the difference image generation module 121 outputs the difference image 303. The difference image generation module 121 may, for example, subtract a plurality of pixel values of the previous image 301 from a plurality of pixel values of the current image 302 so as to generate the difference image 303 with an image difference region 3031 (corresponding to a smoke occurrence region), but the present disclosure is not limited thereto, and the present disclosure will be illustrated in detail below by an embodiment in FIG. 4. It should be noted that the difference image 303 is a gray-scale image.

In the step S230, the smoke detection system 100 may input the current image 302 and the difference image 303 to the semantic segmentation model 122 by the processor 110 so that the semantic segmentation model 122 outputs a smoke confidence map 304. In this embodiment, the smoke confidence map 304 may be generated based on whether a current environment is a dark environment or a bright environment; and the smoke confidence map 304 output by the semantic segmentation model 122 may be a confidence value distribution map with two categories of normal (i.e. non-smoke) and smoke, wherein the smoke confidence map 304 may be a gray-scale image. In this embodiment, the semantic segmentation model 122 uses color channels of red (R) pixels, green (G) pixels, and a blue (B) pixels in the current image 302 and a gray-scale pixel channel of the difference image 303 as four channels of input data in a training phase or an execution phase, so as to learn to determine spatial information of an image and determine dynamic difference change information of the image changing over time. In this embodiment, the semantic segmentation model 122 may be, for example, modified and expanded based on a BiSeNetV2 semantic segmentation model, but the present disclosure is not limited thereto.

In the step S240, the smoke detection system 100 may analyze the smoke confidence map 304 by the processor 110 to determine whether a smoke event occurs in the current image 302. In this embodiment, the processor 110 may execute the pixel confidence value determination module 123 to determine a number of smoke pixels each having a confidence value greater than a pixel confidence threshold in the smoke confidence map 304 based on the pixel confidence threshold, wherein each pixel in a region 3041 of the smoke confidence map 304 is a smoke pixel. As such, the processor 110 may determine whether the number of smoke pixels is greater than a smoke pixel threshold so as to determine whether a smoke event occurs in the current image 302. In addition, in an embodiment, the processor 110 may also determine a smoke pixel distribution in the smoke confidence map 304 in combination, so as to determine whether the smoke event occurs in the current image 302 by determining whether an area of the smoke pixel region is greater than an area threshold.

Therefore, the processor 110 may in turn execute the smoke alarm determination module 124 so as to instantly detect whether a smoke event occurs in the current scene and correspondingly give an alarm. In this embodiment, the smoke detection system 100 may output a current image 305 marked with a smoke region 3051 to an external display device to instantly display a current scene image in which the smoke event occurs to a scene monitoring personnel through the external display device, so that the scene monitoring personnel can be efficiently notified of the smoke situation.

Figure 4:
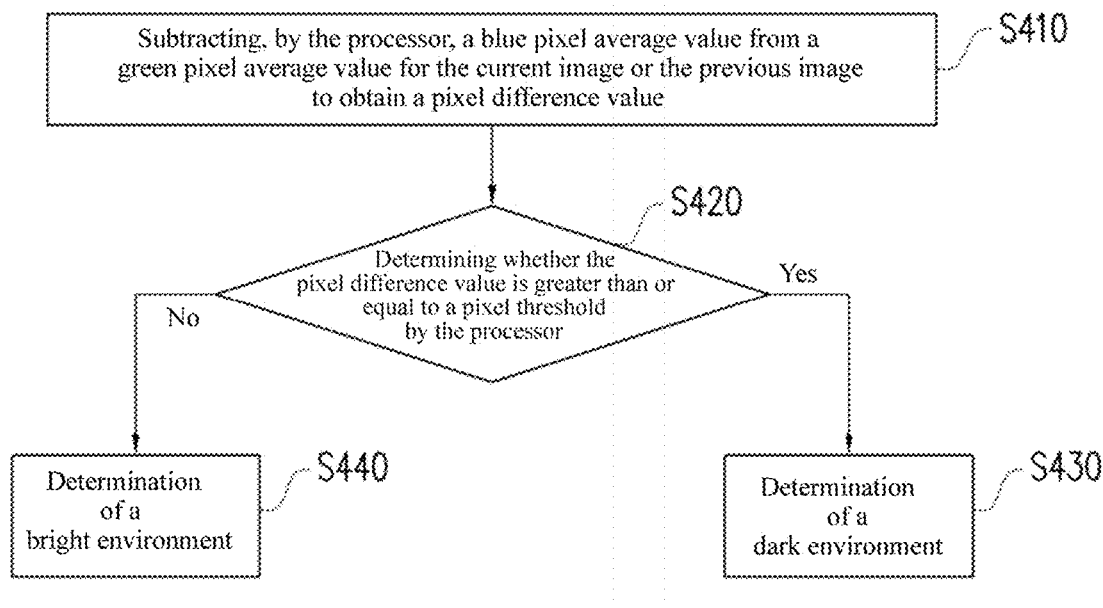
FIG. 4 is a flow chart of determining a current environment according to an embodiment of the present disclosure.

FIG. 4 is a flow chart of determining a current environment according to an embodiment of the present disclosure. With reference to FIG. 1 to FIG. 4, the step S220 in FIG. 2 and the approach of generating the difference image 303 by the difference image generation module 121 may also be implemented in a determination by the steps S410 to S440 in FIG. 4. In the step S410, the smoke detection system 100 may subtract, by the processor 110, a blue pixel average value (AVG_B) from a green pixel average value (AVG_G) for the current image 302 or the previous image 301 to obtain a pixel difference value (AVG_G−AVG_B). In the step S420, the smoke detection system 100 may determine whether the pixel difference value (AVG_G−AVG_B) is greater than or equal to a pixel threshold (AVG_TH) by the processor 110.

If the pixel difference value is greater than or equal to the pixel threshold (AVG_G−AVG_B≥AVG_TH), in the step S430, the processor 110 determines that the current environment is the dark environment. The processor 110 may carry out an sRGB color space difference operation on the current image 302 and the previous image 301 and may obtain the difference image 303. In addition, the processor 110 may correspondingly provide neural network parameters corresponding to the dark environment, e.g., the weight and the like, to the semantic segmentation model 122, so that the semantic segmentation model 122 can effectively analyze the difference image 303 corresponding to the dark environment. In addition, in one embodiment, after the sRGB color space difference operation is carried out on the current image 302 and the previous image 301, the processor 110 can also carry out at least one of an image erosion process and an image dilation process on the difference image 303, so that needless bright and small noise points in the difference image 303 can be removed.

In this embodiment, the processor 110 may, for example, perform the sRGB color space difference operation of the following Formula (1) and Formula (2) on each pixel in the current image 302 and a corresponding pixel of the previous image 301 to obtain a pixel value (gray-scale value) of a corresponding pixel in the difference image 303. In the following Formula (1), a parameter ΔC represents a pixel value (gray-scale value) of a pixel in the difference image 303. A parameter $\Delta R^2$ represents a square of a pixel difference value between a red sub-pixel of a pixel in the current image 302 and a corresponding red sub-pixel in the previous image 301. A parameter $\Delta G^2$ represents a square of a pixel difference value between a green sub-pixel of a pixel in the current image 302 and a corresponding green sub-pixel in the previous image 301. A parameter $\Delta B^2$ represents a square of a pixel difference value between a blue sub-pixel of a pixel in the current image 302 and a corresponding blue sub-pixel in the previous image 301. A parameter R1 represents a pixel value of a red sub-pixel of a pixel in the current image 302. A parameter R2 represents a pixel value of a red sub-pixel of a pixel in the previous image 301.

$$\Delta C = \sqrt{\left(2 + \frac{\overline{r}}{256}\right) \times \Delta R^2 + 4 \times \Delta G^2 + \left(2 + \frac{255 - \overline{r}}{256}\right) \times \Delta B^2} \quad \text{Formula (1)}$$

$$\overline{r} = \frac{R1 + R2}{2} \quad \text{Formula (2)}$$

On the contrary, if the pixel difference value is less than the pixel threshold (AVG_G−AVG_B<AVG_TH), in the step S440, the processor 110 determines that the current environment is the bright environment. The processor 110 may carry out an image dark channel calculation on the current image 302 and the previous image 301 respectively to generate a current dark channel image and a previous dark channel image. It should be noted that dark channel calculation in this embodiment refers to selecting the minimum value of the red sub-pixel, the green sub-pixel, and the blue sub-pixel of each pixel in the current image 302 and the previous image 301 respectively, and storing them respectively into the corresponding pixels in the current dark channel image and those in the previous dark channel image. Then, the processor 110 may subtract a plurality of pixel values of the previous dark channel image from a plurality of corresponding pixel values of the current dark channel image and filter out the portions of negative values to generate the difference image 303. In addition, the processor 110 can correspondingly provide neural network parameters corresponding to the bright environment, e.g., the weight and the like, to the semantic segmentation model 122, so that the semantic segmentation model 122 can effectively analyze the difference image 303 corresponding to the bright environment. Besides, in an embodiment, the processor 110 may carry out image erosion processes on the current dark channel image and the previous dark channel image respectively, and then subtract a plurality of pixel values of the previous dark channel image after the image erosion process from a plurality of corresponding pixel values of the current dark channel image after the image erosion process, so that the needless bright and small noise points and fine structures in the difference image 303 can be removed.

Therefore, in this embodiment, the smoke detection system 100 may respectively generate the difference image 303 by different ways based on different environmental illumination conditions. Therefore, the smoke detection system 100 can be adapted to various environments of variable illuminations and can provide an effective and reliable smoke detection function. In addition, in one embodiment, the processor 110 of the smoke detection system 100 may perform the environment determination in the above steps S410 to S440 in, e.g., an interval of every ten images during sequential acquisitions of the images by the camera 130, so that smoke detection can be effectively carried out for long time. In other embodiments, the processor 110 may also subtract the blue pixel average value (AVG_B) from the red pixel average value (AVG_R) to obtain a pixel difference value (AVG_R−AVG_B), and determine that the current environment is the dark environment when the pixel difference value (AVG_R−AVG_B) is greater than or equal to the pixel threshold AVG_TH, and determine that the current environment is the bright environment when the pixel difference value (AVG_R−AVG_B) is not greater than or equal to the pixel threshold AVG_TH. In another embodiment, the processor 110 may also determine whether the current environment is the dark environment or the bright environment based on other methods; for example, determining based on a luminance value L* of a CIELAB color space. For example, when the luminance value L* is less than a luminance threshold, the processor 110 determines that the current environment is the dark environment, and if not, the processor 110 determines that the current environment is the bright environment. In yet another embodiment, the processor 110 may also determine other parameters correspondingly (such as the pixel confidence threshold and the smoke pixel threshold) based on whether the current environment is the dark environment or the bright environment; for example, the pixel confidence threshold of the dark environment and the pixel confidence threshold of the bright environment may be of different values.

Figure 5:
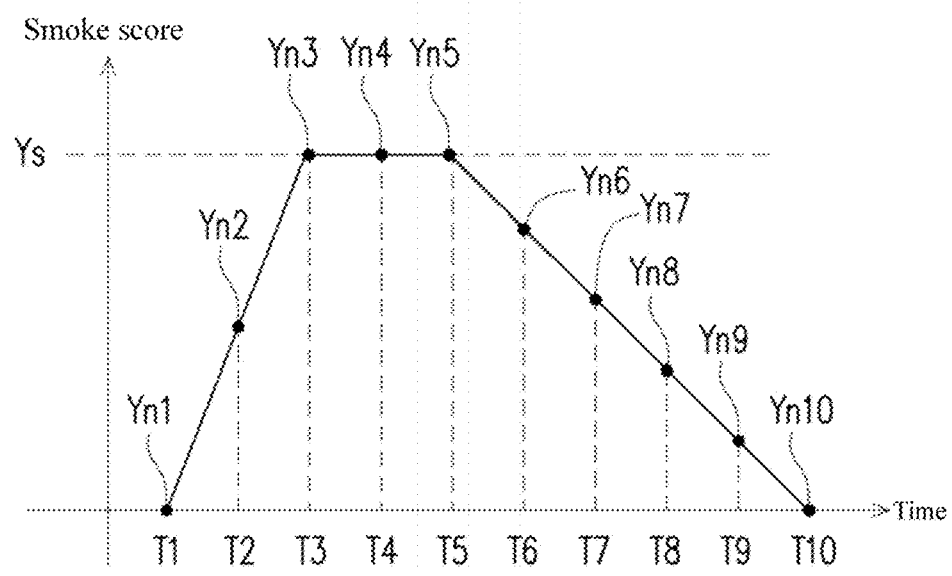
FIG. 5 is a schematic diagram of calculating a smoke score according to an embodiment of the present disclosure.

FIG. 5 is a schematic diagram of calculating a smoke score according to an embodiment of the present disclosure. With reference to FIG. 1 and FIG. 5, the step S240 in FIG. 2 and the generation of the smoke alarm of the smoke alarm determination module 124 may be implemented by calculating a smoke score. In this embodiment, the processor 110 of the smoke detection system 100 can perform a smoke alarm fuzzy logic, and the smoke alarm fuzzy logic may be an algorithm and be stored in the storage unit 120. In this embodiment, the smoke detection system 100 may sequentially acquire a plurality of images through the camera 130. Then, the smoke detection system 100 may analyze these images by the processor 110 to generate a plurality of smoke confidence maps (the smoke confidence map 304 as shown in FIG. 3). In this embodiment, the processor 110 may determine whether the smoke event occurs according to these smoke confidence maps and the smoke alarm fuzzy logic.

As shown in FIG. 5, for the timings T1 to T10, the processor 110 may respectively analyze a plurality of current images from T1 to T10 to generate a plurality of smoke confidence maps, and carry out pixel confidence value determinations on the plurality of smoke confidence maps to respectively calculate smoke scores Yn1 to Yn10 for the timings T1 to T10. For example, at the timing T1, Yn1=0, so a smoke alarm is not given, and if the processor 110 determines that the number of smoke pixels each having a confidence value greater than the pixel confidence threshold in the smoke confidence map is increased from the timing T1 to the timing T2, that is, the number of smoke pixels in the smoke confidence map for an image corresponding to the timing T2 (the current image) is more than that for an image corresponding to the timing T1 (the previous image), the processor 110 increases the smoke score Yn1 to the smoke score Yn2, but at the moment, Yn2 does not reach a smoke score threshold Ys, so the smoke alarm is not given. When the smoke score has increased to the smoke score threshold Ys (for example, at the timing T3), the processor 110 gives the smoke alarm and may not further increase the score (the smoke score is kept at the smoke score threshold Ys, e.g., at the timings T4 and T5). On the contrary, for another example, if the processor 110 determines that the number of smoke pixels is reduced from the timing T5 to the timing T6, that is, the number of smoke pixels each having a confidence value greater than the pixel confidence threshold in the smoke confidence map for an image corresponding to the time T6 (the current image) is less than that for an image corresponding to the time T5 (the previous image), the processor 110 reduces the smoke score Yn5 to the smoke score Yn6, but at the moment, Yn6 has not been reduced to 0, so the smoke alarm is still given, and the smoke alarm is not stopped until the timing T10 when Yn10 is reduced to 0.

Therefore, the processor 110 can define that, in case of no smoke alarm, the smoke alarm determination module 124 only gives the smoke alarm when the smoke score increases to the smoke score threshold Ys; and in case of the smoke alarm, the smoke alarm determination module 124 may not cancel the smoke alarm until the smoke score reduces to 0. Therefore, the smoke detection system 100 can achieve the reliable, smooth, and stable smoke detection function, and can effectively avoid misjudgment or frequent switching of the smoke alarm state.

From the above, according to the smoke detection system and the smoke detection method provided by the present disclosure, it can be effectively determined whether the smoke event occurs in the current scene shot by the camera in a manner of real-time image monitoring. In addition, according to the smoke detection system and the smoke detection method provided by the present disclosure, it also can be automatically determined whether the current scene is the bright environment or the dark environment, so that the semantic segmentation model can carry out proper analysis and processing, and the adaptive smoke detection function for different illumination environments can be achieved.

The foregoing embodiments are merely preferred embodiments of the present disclosure, but not intended to define the scope of the present disclosure. Those skilled in the art, without departure from the spirit and the scope of the present disclosure, may further make improvements and variations on such basis, and thus, the scope of protection of the present disclosure should be defined by the scope of the claims of the present disclosure.

What is claimed is:

1. A smoke detection system, comprising:
a camera configured to acquire a current image and a previous image;
a storage unit configured to store a plurality of modules; and
a processor coupled with the camera and configured to execute the plurality of modules to:
generate a difference image based on the current image and the previous image;
input the current image and the difference image to a semantic segmentation model so that the semantic segmentation model outputs a smoke confidence map, wherein the smoke confidence map is generated based on whether a current environment is a dark environment or a bright environment; and
analyze the smoke confidence map to determine whether a smoke event occurs in the current image.

2. The smoke detection system according to claim 1, wherein the camera is configured to sequentially acquire a plurality of images, and the processor is configured to analyze the plurality of images to generate a plurality of smoke confidence maps, wherein the processor is configured to determine whether the smoke event occurs based on the plurality of smoke confidence maps and a smoke alarm fuzzy logic.

3. The smoke detection system according to claim 1, wherein the processor is configured to subtract a plurality of pixel values of the previous image from a plurality of corresponding pixel values of the current image to generate the difference image.

4. The smoke detection system according to claim 1, wherein the processor is configured to determine a number of smoke pixels each having a confidence value greater than a pixel confidence threshold in the smoke confidence map based on the pixel confidence threshold, and the processor is configured to determine whether the number of smoke pixels is greater than a smoke pixel threshold to determine whether the smoke event occurs in the current image.

5. The smoke detection system according to claim 1, wherein the processor is configured to subtract a blue pixel average value from a green pixel average value for the current image or the previous image to obtain a pixel difference value,
in response to the processor determining that the pixel difference value is greater than or equal to a pixel threshold, the processor determines that the current environment is the dark environment, and
In response to the processor determining that the pixel difference value is less than the pixel threshold, the processor determines that the current environment is the bright environment.

6. The smoke detection system according to claim 1, wherein in response to the processor determining that the current environment is the bright environment, the processor performs image dark channel calculations on the current image and the previous image respectively to generate a current dark channel image and a previous dark channel image, and the processor subtracts a plurality of pixel values of the previous dark channel image from a plurality of corresponding pixel values of the current dark channel image to generate the difference image.

7. The smoke detection system according to claim 6, wherein the processor is configured to perform image erosion processes on the current dark channel image and the previous dark channel image respectively, and then subtract the plurality of pixel values of the previous dark channel image after the image erosion process from the plurality of corresponding pixel values of the current dark channel image after the image erosion process, to generate the difference image.

8. The smoke detection system according to claim 1, wherein in response to the processor determining that the current environment is the dark environment, the processor performs sRGB color space difference operations on the current image and the previous image to obtain the difference image.

9. The smoke detection system according to claim 1, wherein the processor is configured to input a color channel of red pixels in the current image, a color channel of green pixels in the current image, a color channel of blue pixels in the current image, and a gray-scale pixel channel of the difference image as four channels of input data to the semantic segmentation model.

10. The smoke detection system according to claim 1, wherein the processor and the storage unit are provided at a cloud server, and the camera is configured to provide the current image and the previous image to the cloud server through a communication module.

11. A smoke detection method, comprising:
acquiring a current image and a previous image by a camera;
generating, by a processor, a difference image based on the current image and the previous image;
inputting, by the processor, the current image and the difference image to a semantic segmentation model so that the semantic segmentation model outputs a smoke confidence map, wherein the smoke confidence map is generated based on whether a current environment is a dark environment or a bright environment; and
analyzing, by the processor, the smoke confidence map to determine whether a smoke event occurs in the current image.

12. The smoke detection method according to claim 11, further comprising:
acquiring, by the camera, a plurality of images sequentially;
analyzing, by the processor, the plurality of images to generate a plurality of smoke confidence maps; and
determining, by the processor, whether the smoke event occurs based on the plurality of smoke confidence maps and a smoke alarm fuzzy logic.

13. The smoke detection method according to claim 11, wherein said generating the difference image includes:
subtracting, by the processor, a plurality of pixel values of the previous image from a plurality of corresponding pixel values of the current image to generate the difference image.

14. The smoke detection method according to claim 11, wherein said determining whether the smoke event occurs in the current image includes:
determining, by the processor, a number of smoke pixels each having a confidence value greater than a pixel confidence threshold in the smoke confidence map based on the pixel confidence threshold; and
determining, by the processor, whether the number of smoke pixels is greater than a smoke pixel threshold to determine whether the smoke event occurs in the current image.

15. The smoke detection method according to claim 11, wherein said generating the difference image based on the current image and the previous image includes:
subtracting, by the processor, a blue pixel average value from a green pixel average value for the current image or the previous image to obtain a pixel difference value;
determining, by the processor, that the current environment is the dark environment in response to the processor determining that the pixel difference value is greater than or equal to a pixel threshold; and
determining, by the processor, that the current environment is the bright environment in response to the processor determining that the pixel difference value is less than the pixel threshold.

16. The smoke detection method according to claim 11, wherein said generating the difference image based on the current image and the previous image further includes:
in response to the processor determining that the current environment is the bright environment, performing by the processor image dark channel calculations on the current image and the previous image respectively, to generate a current dark channel image and a previous dark channel image; and
subtracting, by the processor, a plurality of pixel values of the previous dark channel image from a plurality of corresponding pixel values of the current dark channel image to generate the difference image.

17. The smoke detection method according to claim 16, wherein said generating the difference image based on the current image and the previous image further includes:
by the processor, performing image erosion processes on the current dark channel image and the previous dark channel image respectively, and then subtracting the plurality of pixel values of the previous dark channel image after the image erosion process from the plurality of corresponding pixel values of the current dark channel image after the image erosion process to generate the difference image.

18. The smoke detection method according to claim 11, wherein said generating the difference image based on the current image and the previous image further includes:
in response to the processor determining that the current environment is the dark environment, performing, by the processor, sRGB color space difference operations on the current image and the previous image to obtain the difference image.

19. The smoke detection method according to claim 11, wherein said inputting the current image and the difference image to the semantic segmentation model further includes:
inputting, by the processor, a color channel of red pixels in the current image, a color channel of green pixels in the current image, a color channel of blue pixels in the current image, and a gray-scale pixel channel of the difference image as four channels of input data to the semantic segmentation model.

20. The smoke detection method according to claim 11, wherein the processor and a storage unit storing a plurality of modules to be executed by the processor are provided at a cloud server, and the camera is configured to provide the current image and the previous image to the cloud server through a communication module.

* * * * *